United States Patent [19]
LaRochelle et al.

[11] Patent Number: 5,533,195
[45] Date of Patent: Jul. 2, 1996

[54] TESTING TOOL FOR DIAGNOSING DEFECTIVE COMPUTER SYSTEM DEVICES

[76] Inventors: Paul E. LaRochelle, 40 Phillips Ave., Shrewsbury, Mass. 01545; Arthur J. Beaverson, 37 Cobleigh Rd., Boxboro, Mass. 01719

[21] Appl. No.: 399,956

[22] Filed: Mar. 6, 1995

Related U.S. Application Data

[63] Continuation of Ser. No. 86,594, Jul. 1, 1993, abandoned.
[51] Int. Cl.$^6$ ................................................. G06F 11/00
[52] U.S. Cl. ........................... 395/185.01; 395/183.22
[58] Field of Search ........................... 371/8.2, 8.1, 11.2; 395/185.01, 185.09, 185.10, 183.22

[56] References Cited

U.S. PATENT DOCUMENTS

| | | | |
|---|---|---|---|
| 4,519,068 | 5/1985 | Krebs et al. | 370/82 |
| 5,090,014 | 2/1992 | Polich et al. | 371/15.1 |
| 5,121,396 | 6/1992 | Irvin et al. | 371/53 |
| 5,173,689 | 12/1992 | Kusano | 340/827 |
| 5,260,945 | 11/1993 | Rodeheffer | 371/8.2 |

*Primary Examiner*—Hoa T. Nguyen
*Attorney, Agent, or Firm*—Diane C. Drozenski; Denis G. Maloney; Arthur W. Fisher

[57] ABSTRACT

A flexible software testing tool provides fast and efficient diagnosis of defective computer system devices. The software testing tool includes an action string command qualifier that enables dynamic exercising of target computer devices by specifying certain operations involving those devices. Additional command qualifiers are provided to define the operating conditions of the device interaction paths. The operations specified by the qualifiers typically require interactions between a plurality of devices, thereby creating combinations of device interaction paths within the system to detect intermittent device failures.

7 Claims, 5 Drawing Sheets

TESTING TOOL FOR DIAGNOSING DEFECTIVE COMPUTER SYSTEM DEVICES

This application is a continuation, of application Ser. No. 08/086,594, filed Jul. 1, 1993, now abandoned.

FIELD OF THE INVENTION

This invention relates generally to computer systems and, more specifically, to the detection of faults in a computer system.

BACKGROUND OF THE INVENTION

A typical computer system includes a central processing unit (CPU), a main memory unit, and at least one input/output (I/O) unit. The main memory unit stores information, including data and instructions for processing the data, in addressable storage locations. The CPU initiates transfers of the information between it and the main memory unit. The CPU interprets the incoming information as either instructions or data, and processes the data in accordance with the instructions. The results are then stored in the addressable locations in main memory unit.

The I/O unit also communicates with the main memory unit in order to transfer information into the system and to obtain processed data from it. The I/O unit normally operates in accordance with control information supplied to it by the CPU. The control information defines an I/O operation to be performed by the I/O unit, such as the transfer of program information, i.e., information used by a software program, between the I/O unit and the main memory unit. Typical devices comprising the I/O unit may include printers and video display terminals, or secondary information storage devices such as disks or tapes.

Because a computer system contains many units and devices with complex interrelationships implemented in both hardware and software, there are typically many faults that may occur in a variety of ways in the system. Extensive testing of the system may reveal faulty hardware devices and identifiable defects in the design of the hardware and software. However, some failures, e.g. intermittent failures, only manifest during interaction between certain devices and, even then, only during specific times and sequences. Typically, these intermittent failures are detected only after weeks or months of normal operation. Attempts to simulate these extended periods of normal operation in hopes of uncovering such failures involve time consuming procedures.

For example, multiple computer programs have been employed to test a variety of computer device interaction paths when "exercising" a computer system. Once a defect is detected, additional software is developed to extensively test that particular interaction path. Development of such special-purpose software is expensive and time consuming.

Therefore, it is among the objects of the invention to provide a method and apparatus for efficiently creating device interaction paths to manifest intermittent device failures.

Another object of the invention is to provide a method and apparatus for quickly creating combinations of device interaction paths to manifest intermittent device failures.

SUMMARY OF THE INVENTION

The invention resides in a flexible testing arrangement that provides fast and efficient diagnosis of defective computer system devices by exercising at least one of those devices. Specifically, the testing arrangement includes a software tool having a command qualifier, i.e., an "action string" qualifier, that enables dynamic exercising of target computer devices by specifying certain operations involving those devices. These operations typically require interactions between a plurality of devices, thereby creating combinations of device interaction paths within the system.

More specifically, the action string qualifier specifies a list of device directives targeted for one or more computer devices. Each device directive is preferably a single character code corresponding to a unique operation that is provided by a user when the software testing tool is invoked.

The software testing tool accommodates additional command qualifiers that define the operating conditions of the device interaction paths. For example, the command qualifiers may specify (i) the range of addresses within the target device upon which the action string is to operate; (ii) the number of passes of the software to execute; (iii) the range of addresses within main memory where two buffers, e.g., buffer 1 and buffer 2, are located; (iv) the packet size, i.e., the number of bytes to be read or written for each I/O operation; (v) the data pattern used to initialize buffer1 and buffer2; (vi) whether to collect and report all the data that was read from the target device; and (vii) whether to report statistics on the number and timings of device operations.

In an illustrative embodiment of the invention, a user invokes the software testing tool by entering an exerciser command at a terminal, and thereafter specifying at least one target device, as well as certain operations, e.g., read, write and compare operations, and conditions involving that device, by way of a sequence of character codes following the command. The software testing tool is then invoked to read each character code, including those of the action string, and perform the corresponding operations on the target device in accordance with the additional qualifiers. If more than one device is specified, the testing tool executes the character codes for each target device, in parallel, thereby providing a means for exercising various devices, and combinations of devices, of the system.

An advantage of the invention is the flexibility provided by the testing tool, including the action string, that allows dynamic selection of various device interaction paths and operations without having to develop additional software once a defect is detected.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
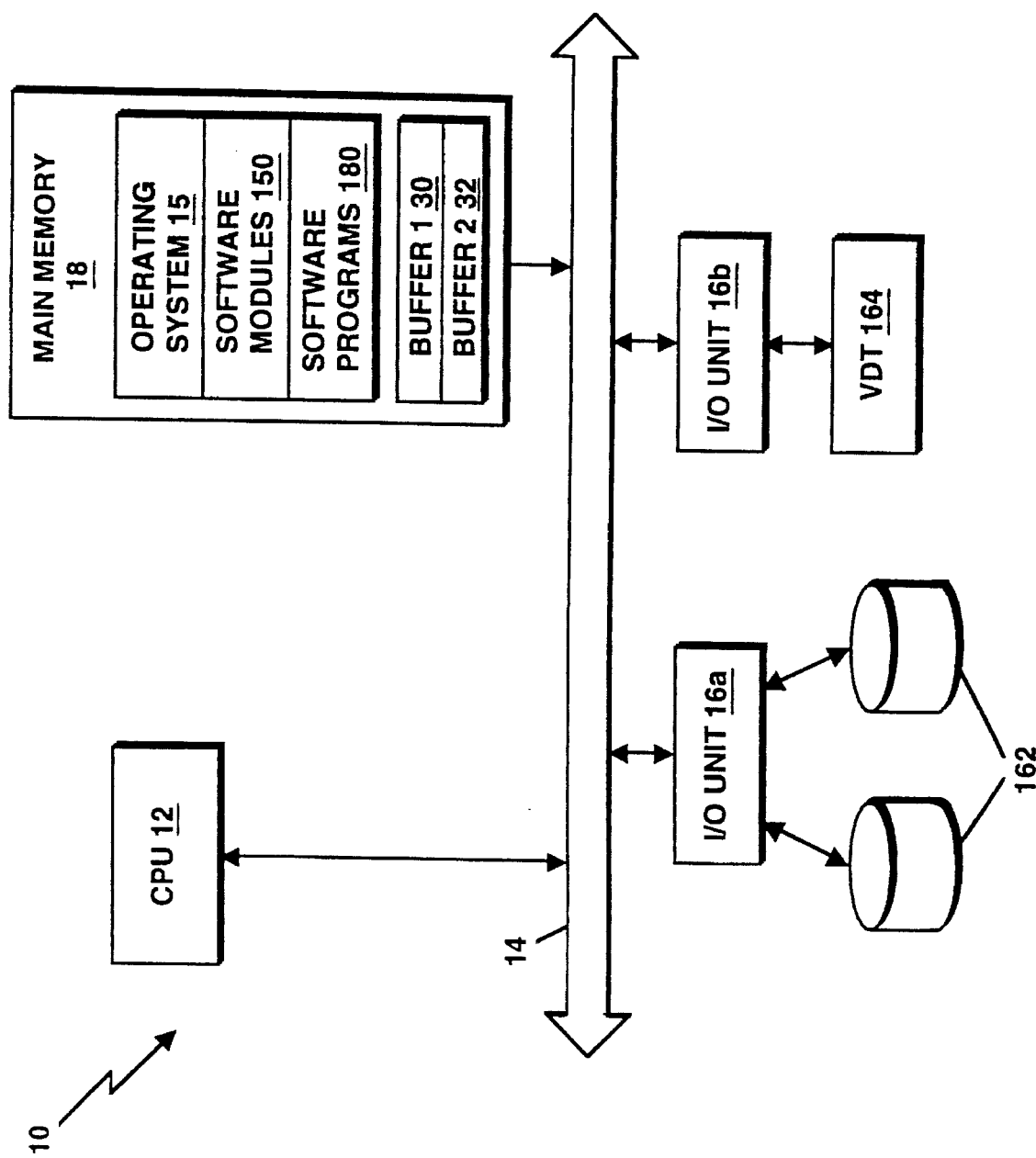
FIG. 1 is a diagram of portions of a computer system, including a central processing unit, a main memory unit and input/output units interconnected by a system bus.

Referring now to the drawings and particularly to FIG. 1, portions of a computer system 10 relevant to the invention include a CPU 12, a main memory unit 18 and input/output (I/O) units 16a,b interconnected by a system bus 14. The system bus 14 provides a communication path for the transfer of information to and from the CPU 12 and main memory 18. Similarly, the I/O units 16 communicate with main memory via the system bus 14 to transfer information into the system and to obtain processed data from it. The I/O units 16 typically include devices such as magnetic disks 162 and video display terminals (VDTs 164), the latter providing a means for a user to invoke software programs for execution on the system.

An operating system 15, portions of which are typically resident in main memory 18 and executed by the CPU 12, functionally organizes the computer 10. The operating system 15 also includes, inter alia, software modules 150 executed by the CPU 12 when invoking operations in support of the a software program running on the computer 10. For the exemplary embodiment disclosed herein, the software program 180 pertains to diagnosis of defective computer system devices, such as the main memory 18, the CPU 12, the system bus 14 and the I/O units and their associated devices. Such diagnosis typically requires extensive exercising of the devices and their interaction paths in order to manifest intermittent failures.

In accordance with the invention, a flexible testing arrangement provides fast and efficient diagnosis of defective computer system devices. The testing arrangement comprises a software tool, i.e., an EXER software program 180, that may be configured either as a diagnostic tool to detect defective computer devices, or as a performance measuring tool to report performance statistics. When functioning as a diagnostic tool, EXER exercises one or more devices by performing read, write, and compare operations involving at least two buffers, e.g, buffer1 30 and buffer2 32, each of which is located in main memory. Specifically, a read operation fetches data from a specified computer device and stores it in one of the buffers. A write operation fetches data from a buffer and stores it on the specified device. As described further herein, the read and write operations can be performed using either buffer. A compare operation utilizes both buffers when comparing the contents of the buffers.

Figure 2:
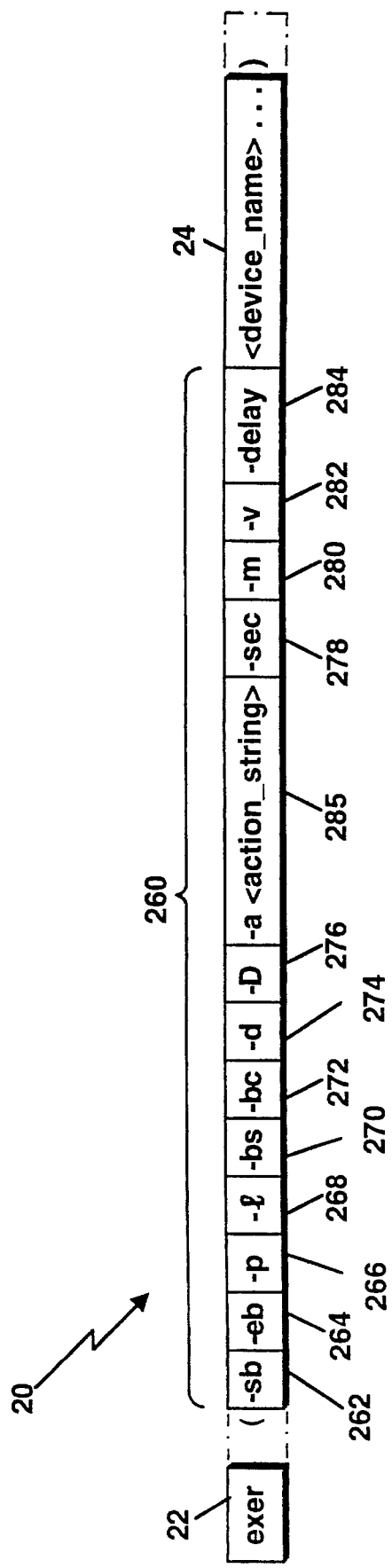
FIG. 2 illustrates the format of an exer command string in accordance with the invention that is used to invoke a software testing tool for exercising the components of FIG. 1.

Generally, the EXER program 180 may be invoked by a user when specifying an exer command at a terminal prompt of the VDT 164, e.g., >>>exer. The exer command is followed by a string of characters that includes arguments and qualifiers, the latter comprising parameters that mollify the command. An example of a command argument is exer duc0 duc1, where duc0 and duc1 are the names of two devices to be exercised. The character <*>, a wildcard specifier, may also be used as an argument in the command exer du* to, e.g., exercise all devices having names that begin with the letters du. FIG. 2 illustrates the format of the exer command string 20, including the arguments and qualifiers, used to invoke the software testing tool EXER.

Each command qualifier is preferably preceded by the character <–>, such as in the expression exer –x, where x is the name of the qualifier. In accordance with the invention, an "action string" qualifier <a> enables dynamic exercising of target computer devices by specifying certain operations involving those devices. These operations typically require interactions between a plurality of devices, thereby creating combinations of device interaction paths within the system.

Specifically, the action string qualifier specifies a list of device directives, referred to collectively as an action string, that are targeted for one or more computer devices. Each device directive is preferably a single character code corresponding to a unique operation. The operations, e.g., read, write and compare, may be performed in various combinations and sequences. As described further herein, lower-case action string character codes <rw> specify operations that involve buffer1. Upper-case action string characters <RW> specify operations that involve buffer2. The action string character <c> involves both buffers, while the characters <–?> do not involve either buffer. A single quote is preferably used to enclose a string of character codes, e.g., exer –a 'r–Wc'.

In accordance with the invention, other command qualifiers are provided for the software testing tool to define the operating conditions of the device interaction paths. These qualifiers, each of which comprise at least one character code, typically specify (i) the range of addresses within the target device upon which the action string is to operate; (ii) the number of passes of the EXER program to execute; (iii) the range of addresses within main memory where buffer1 and buffer2 are located; (iv) the packet size, i.e., the number of bytes to be read or written for each I/O operation; (v) the data pattern used to initialize buffer1 and buffer2; (vi) whether to collect and report all the data that was read from the target device; and (vii) whether to report statistics on the number and timings of device operations.

Referring to the exer command string 20, the command field 22 contains the reference to the command exer. The argument field 24 contains the target device names <device$_{13}$ name> or filestream(s) to be exercised. Field 260 contains a plurality of subfields containing qualifiers to the command exer. Specifically, the –sb <start$_{13}$ block> subfield 262 specifies the starting block number (hex) within the device and typically has a default of 0; the –eb <end$_{13}$ block> subfield 264 specifies the ending block number (hex) within the device and has a default of the last block number within the device; the –p <pass$_{13}$ count> subfield 266 specifies the number of passes to run the exerciser exer and has a default of 1; the –l <blocks> subfield 268 specifies the number of blocks (hex) to exercise and has a default of the number of blocks within the device; the –bs <block_size> subfield 270 specifies the block size (hex) in bytes with a default of 200 (hex); the –bc <block_per_io> subfield 272 specifies the number of blocks (hex) per IO operation and has a default of either 2048 (devices without length) or 1; the –d <buf1_string> subfield 274 contains a string of arguments, used by a command eval described below, to generate a data pattern for buffer1 and has a default of all bytes set to hex 5A's; the –D <buf2_string> subfield 276 contains a string of arguments for eval to generate a data pattern for buffer2 and has a default of all bytes set to hex 5A's; the –sec <seconds> subfield 278 specifies termination of the EXER program after a predetermined number of seconds have elapsed; the –m subfield 280 specifies a metric mode; the –v subfield 282 specifies a verbose mode; and the –delay <milliseconds> subfield 284 specifies a delay of a predetermined number of milliseconds when the character <–s> appears in the action string.

Several of these qualifiers may be used in a command string to specify, e.g., the amount of device data to be processed, including –sb,–eb, –l,–bs, and –bc, which indicates the number of blocks in a packet, where a packet is the amount of data transferred in one I/O operation. The total number of bytes read or written on each pass of the EXER program is specified by the –l qualifier, i.e., length in blocks, or the −sb,−eb qualifiers, i.e., the starting/ending block address. If neither the ending address nor the length qualifiers are specified, the number of bytes processed on each pass may be determined by the length of the device.

In accordance with an aspect of the invention, the −a <action$_{13}$ string> subfield 285 specifies an exerciser "action string" for determining the sequence of read, write, and compare operations to various buffers. The default action string is <?r>. In the illustrative embodiment of the invention, the character code parameters of the action string include:

r=read data into buffer1;

R=read data into buffer2;

w=write data from buffer1;

W=write data from buffer2;

c=compare the data in buffer1 with the data in buffer2 and display the differences;

d=write a data pattern (specified by a qualifier) to buffer1;

D=write a data pattern (specified by a qualifier) to buffer2;

m=move buffer1 from one location in main memory to another; in addition, change the size of the buffer1 and the packet size to be read or written in subsequent read, write and compare operations;

M=move buffer2 from one location in main memory to another; in addition, change the size of the buffer2 and the packet size to be read or written in subsequent read, write and compare operations;

−=backspace the address pointer within the target device to the address prior to the last read or write operation;

?=move the address pointer within the target device to a random location within an address range (specified by a conditional parameter) so that the next read or write operation will occur at that random location;

s=sleep for a period of milliseconds specified by the delay qualifier. If no delay qualifier is present, sleep for 1 millisecond.

As noted, buffer1 30 and buffer2 32 (FIG. 1) are preferably located in main memory 18. These buffers are preferably initialized to a data pattern before execution of any I/O operations. Typically, each buffer is initialized with a data pattern consisting of a 5A (hex) in every byte of the buffer or by a string of arguments to the command qualifiers −d, −D. This procedure is followed for each byte in the specified buffer.

The −d and −D qualifiers use a postfix string argument to initialize the contents of the buffers. Specifically, the postfix string is passed to an eval command, which evaluates an input string in postfix notation and returns a processed byte value that is then written to the specified buffer. For example, the command string, eval '3 2+' returns the value 5. Similarly, the command string, eval '3 2 1+−' is interpreted as (1+2−3) or 0. Postfix string processors are commonly used tools in the software industry.

Any combination of writing, reading, or comparing the contents of buffer1 and buffer2 may be specified, and executed in sequence, in the action string field 285. The EXER program may return codes after execution of the exer command, including error codes which are immediately returned after an error during a read, write, or compare operation. The return codes may include: (i) msg_success indicating success; (ii) msg_missing_device indicating that the number of command line arguments are not equal to 1; (iii) msg_bad_open indicating a problem opening the specified filepath; (iv) msg_ex_devreaderr indicating a device read error; (v) msg_dep_devwriteerr indicating a device write error; (vi) msg_data_comp_err indicating the contents of buffer1 did not match the contents of buffer2; and (vii) msg_fatal indicating an illegal action string parameter. In addition, error codes may be displayed on the VDT indicating (i) the device address at which a read or write error occurred; and (ii) the last accessed device address prior to a buffer 1/buffer2 miscompare. When the EXER program terminates upon completing all passes or because of operator termination, the returned status will reflect the last failed read, write or compare operation, regardless of subsequent successful I/O operations.

Operationally, a user invokes the software testing tool EXER by entering the command exer at the VDT 164, and thereafter specifying at least one target device, as well as certain operations and conditions involving that device, by way of a sequence of character codes following the command. EXER is then invoked to read each character code, including those of the action string, and perform the corresponding operations on the target device in accordance with the additional qualifiers. If more than one device is specified, the testing tool executes the character codes for each target device, in parallel, thereby providing a means for exercising various devices, and combinations of devices, of the system.

Figure 3:
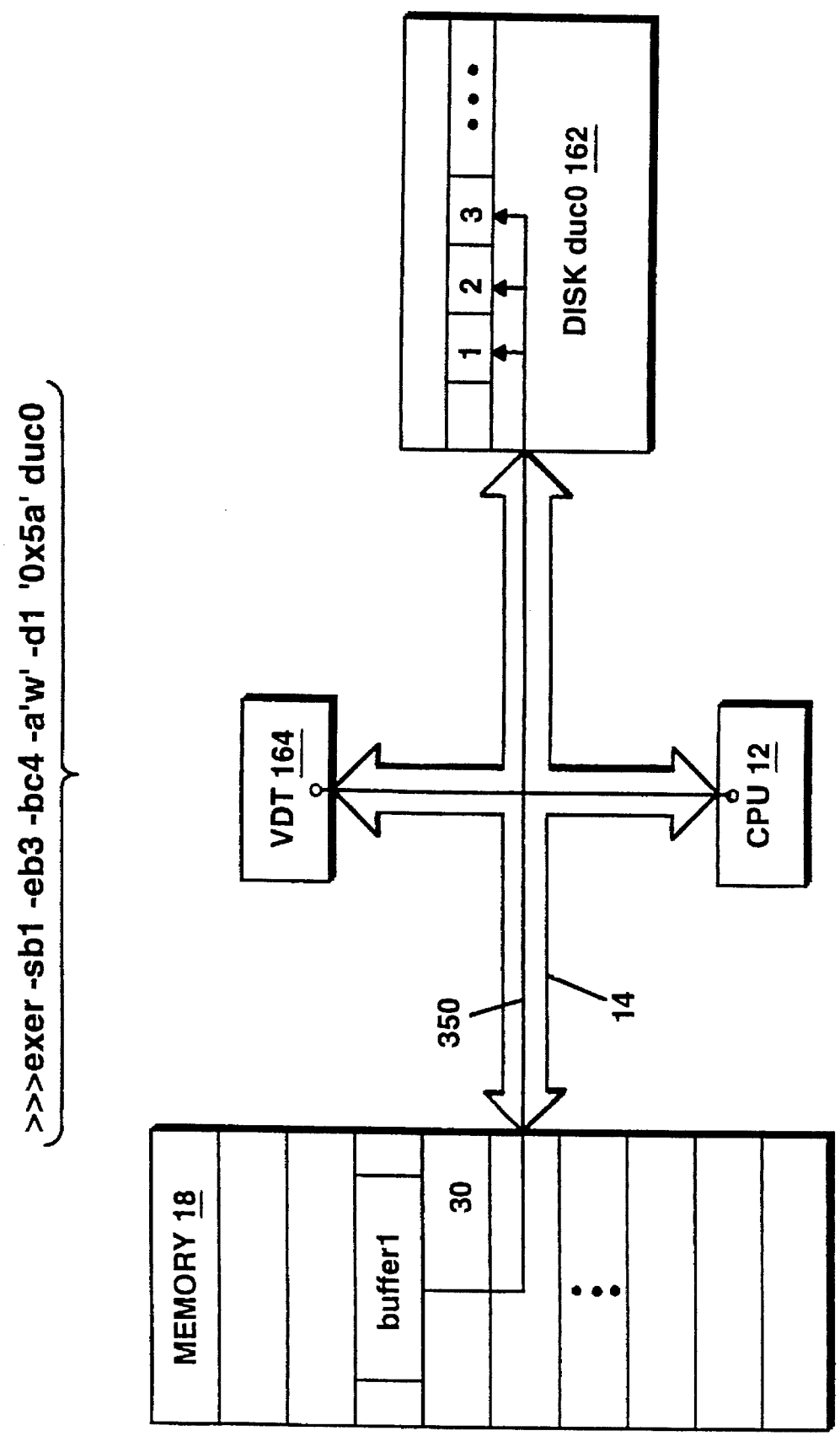
FIG. 3 depicts a device interconnection path of the computer system in connection with the exer command string of FIG. 2.

For example, refer to FIG. 3, which depicts device interconnection paths of the system 10 that are established in connection with the following exer command:

>>>exer−sb 1 −eb 3 −bc 4 −a 'w'−d1 '0×5a'duc0

Upon invoking the EXER program, the CPU 12 is instructed to perform a write operation from buffer1 to each byte of blocks 1, 2 and 3 of disk duc0 162. The data pattern written to the disk is 5A (hex), i.e., 0×5a. The size of the packet is <−bc×−bs> or 4×512=2048, for each write operation. It can be seen from FIG. 3 that device interaction path 350 encompasses the CPU 12, the VDT 164, the main memory 18, disk 162 and system bus 14 devices, thereby exercising each device and their interactions with the other devices.

Figure 4:
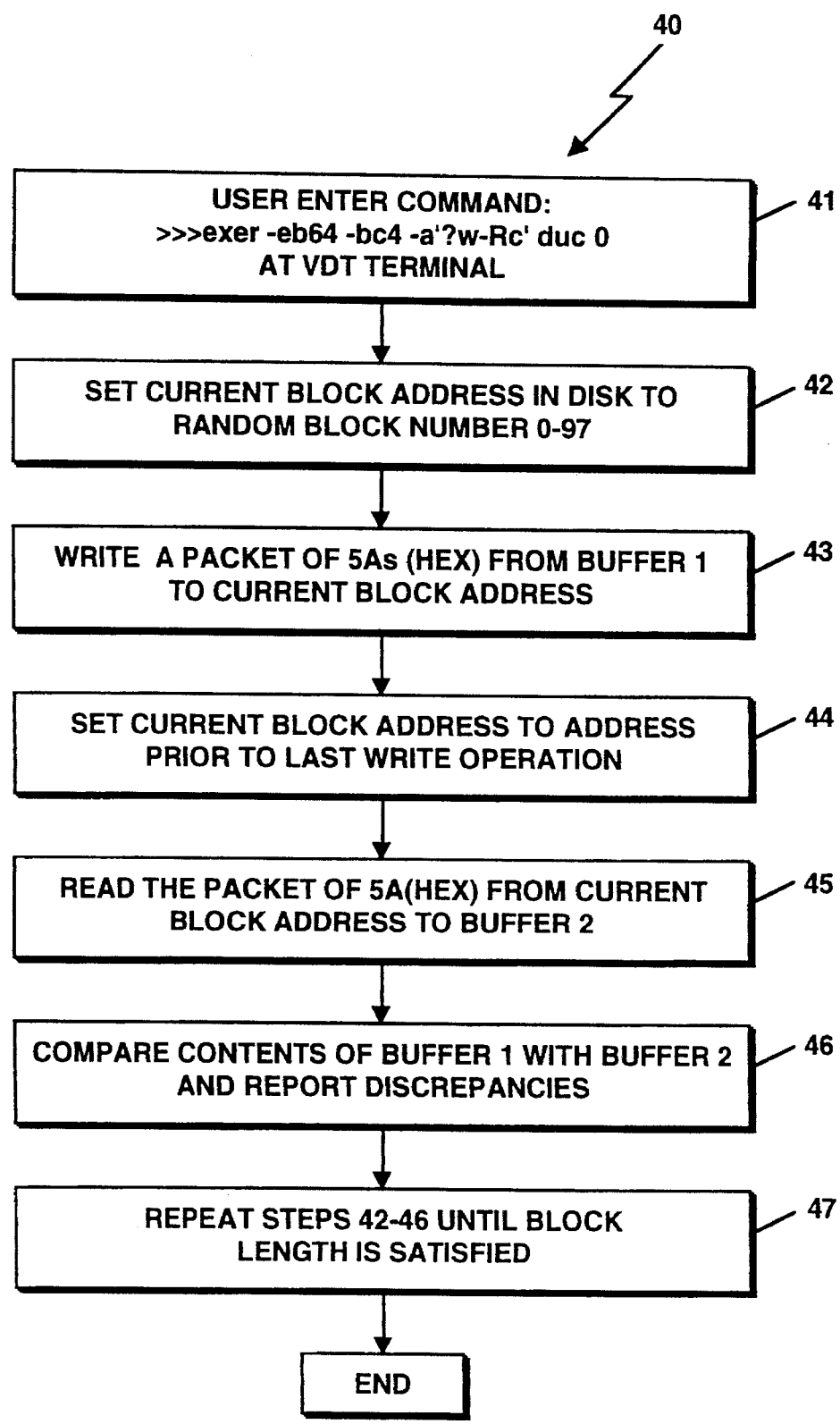
FIG. 4 is a flow diagram illustrating the sequence of operations specified by an action string of the exer command string during execution of a destructive write test.

FIG. 4 is a flow diagram 40 illustrating the sequence of operations specified by the action string field 285, i.e., <−a">, of the exer command string 20 during execution of a destructive write test. Specifically, a user enters the command:

>>>exer −eb 64−bc 4−a '?w−Rc'duc0 at the VDT 164 terminal, thereby invoking EXER and instructing the CPU 12 to perform the destructive write test encompassing block number 0 thru 100 (decimal) on disk duc0. (Step 41.) The packet size is 2048 bytes. The action string <31 a41 > then specifies the following sequence of operations:

(Step 42.) The current block address on disk (due0) 162 is set to a random block number between 0 and 97. Note that block number 97 is the largest possible starting block address of a packet because a four block packet starting at block number 98, 99, or 100 accesses blocks beyond the end of the length to be processed. A random number generator may be used in connection with a memory management module 150 of the operating system 15 (FIG. 1) to establish varying device locations before performing read or write operations.

(Step 43.) CPU 12 executes a write operation of a data packet, consisting of a default of 5As (hex), from buffer1 in main memory 18 to the current block address of disk 162.

(Step 44.) The current block address of disk 162 is reset to the block address prior to the last write operation.

(Step 45.) CPU 12 performs a read operation of the data packet (5A (hex)) from the current block address to buffer2 in main memory 18.

(Step 46.) CPU 12 compares the contents of buffer1 with buffer2 and reports any discrepancies to VDT 164.

(Step 47.) Repeat Steps 42 thru 46 until enough packets have been written to satisfy the length requirement of 101 blocks.

Functionally, each character code in the action string is processed in a sequence from left to right and the action string is repeatedly executed until the specified amount of device data has been processed.

Figure 5:
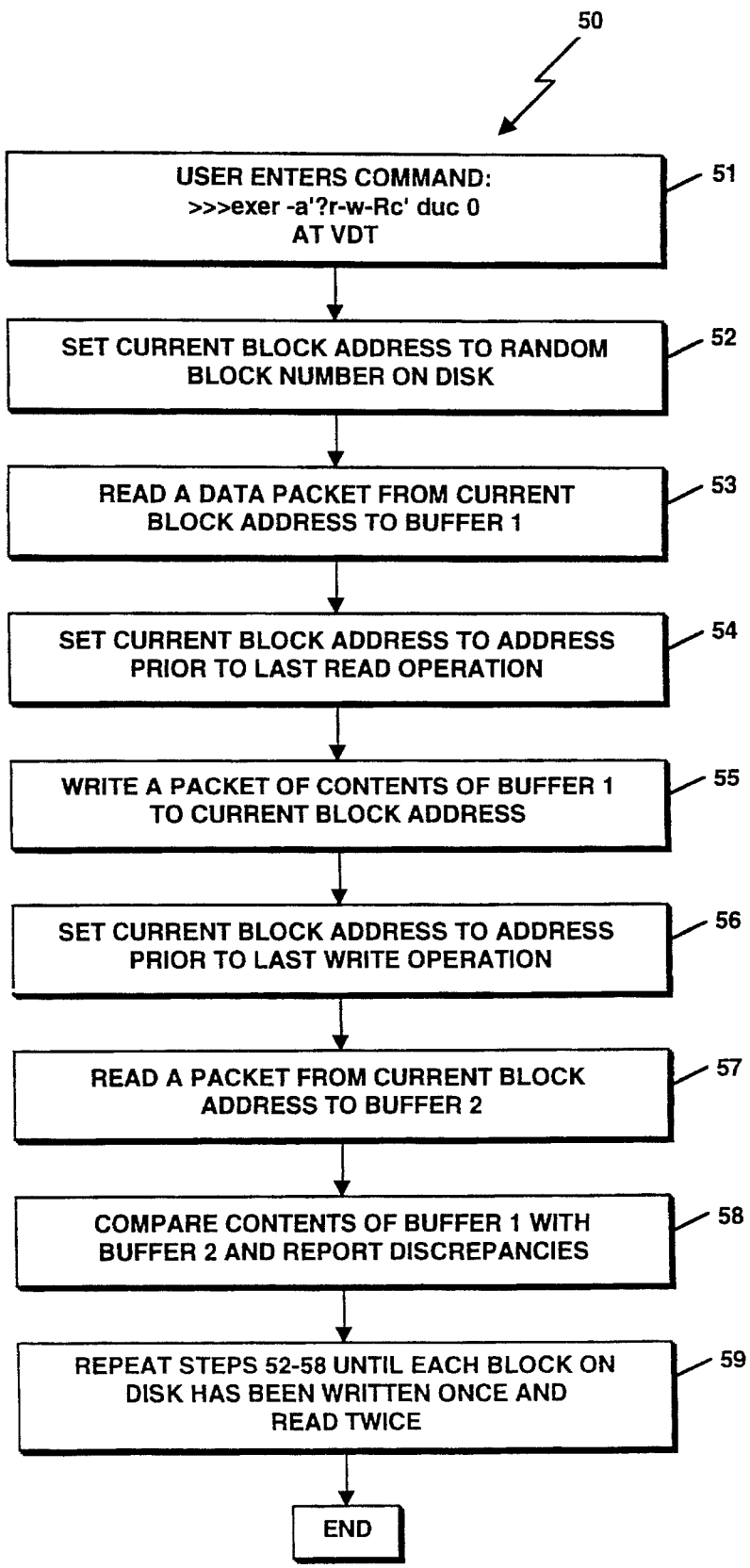
FIG. 5 is a flow diagram illustrating the sequence of operations specified by an action string of the exer command string during execution of a non-destructive write test.

FIG. 5 is a flow diagram 50 illustrating the sequence of operations specified by the action string field 285 of the exer command string 20 during execution of a non-destructive write test. Specifically, a user enters the command:

>>>exer −a'?r−w−Rc'duc0 at the VDT 164, thereby initiating a non-destructive write test having packet sizes of 512 bytes. (Step 51.) The action string <−a"> specifies the following sequence of operations:

(Step 52.) The current block address on disk (duc0) 162 is set to a random block number.

(Step 53.) CPU 12 executes a read operation of a data packet from the current block address to buffer1 in main memory 18.

(Step 54.) The current block address of disk 162 is reset to the block address prior to the last read operation.

(Step 55.) CPU 12 performs a write operation of the contents of buffer1 to the current block address of disk.

(Step 56.) The current block address of disk 162 is reset to the block address prior to the last write operation.

(Step 57.) CPU 12 executes a read operation of a packet from the current block address to buffer2 in main memory 18.

(Step 58.) CPU 12 compares the contents of buffer1 with buffer2 and reports any discrepancies to VDT 164.

(Step 59.) Repeat Steps 52 thru 58 until each block on the disk has been written once and read twice.

In summary, the software testing tool of the invention provides flexibility for efficiently establishing various device interactions paths to detect intermittent failures of defective computer components. Specifically, the action string qualifier and device directives enable selection of various devices and operations to be performed thereon in a dynamic manner, i.e., by merely changing the character codes of the exer command string for each pass of the EXER program. The additional command qualifiers impose operating conditions upon the target devices, thereby allowing exercise of certain components and ranges of interactions among components. Moreover, the flexibility of the testing tool obviates the need to develop additional software once the failure is detected.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

what is claimed is:

1. An apparatus, in a computer system, including input means for exercising components included in said computer system to efficiently detect intermittent failures in said computer system, said components including a system bus interconnecting a processor, a memory and at least one I/O unit coupled to an I/O device, said apparatus comprising:

an arrangement which includes:
command means for specifying a software exerciser, entered at said input means;
means for specifying at least one of said components for exercising, entered at said input means;
means for specifying at least one operation, entered at said input means, to be performed on said at least one of said components; and said apparatus further comprising
means for invoking said software exerciser in response to said command means, to perform said at least one operation specified by said said mean for specifying at least one operation on said at least one component specified by said mean for specifying at least one of said components to establish interaction paths between substantially all of said components of said second computer system to manifest intermittent failures resulting from interaction between said components.

2. The first computer system of claim 1 wherein said means for specifying at least one operation further comprises a plurality of subfields containing parameters for modifying said command.

3. The first computer system of claim 2 wherein one of said plurality of subfields is an action string field containing a list of at least one directive, corresponding to said at least one operation.

4. The first computer system of claim 3 wherein said at least one operation comprises:

one of a read operation, a write operation and a compare operation.

5. The first computer system of claim 4 wherein remaining ones of said plurality of subfields comprise:

means for specifying conditions for performing said at least one operation.

6. A method for exercising components of a computer system to efficiently detect intermittent failures in said system, said components including a system bus interconnecting a processor, a memory and at least one I/O unit coupled to an I/O device, said method comprising the steps of:

specifying a software exerciser;

specifying at least one of said components for exercising;

specifying at least one operation to be performed on said at least one of said components; and invoking said software exerciser to perform said at least one operation on said at least one of said component in a manner that establishes interaction paths between substantially all of said component of said computer system to manifest intermittent failures resulting from interaction between said components.

7. The method of claim 6 further comprising the step of:

specifying conditions for performing said at least one operation.

* * * * *